United States Patent [19]

Rizzoli

[11] Patent Number: 5,577,571

[45] Date of Patent: Nov. 26, 1996

[54] AUTOMOBILE CHASSIS WITH PIVOTED INNER AND OUTER FRAMES

[76] Inventor: Robert L. Rizzoli, 9817 Tiffany Hill Ct., Bethesda, Md. 20814

[21] Appl. No.: 600,163

[22] Filed: Feb. 12, 1996

[51] Int. Cl.$^6$ .................................................. B60K 5/12
[52] U.S. Cl. ...................................... 180/299; 180/291
[58] Field of Search ........................... 180/291, 295, 180/299

[56] References Cited

U.S. PATENT DOCUMENTS

| | | | |
|---|---|---|---|
| Re. 28,675 | 1/1976 | Hobbensiefken | 180/295 X |
| 781,990 | 2/1905 | Ball, Jr. | 180/299 X |
| 792,561 | 6/1905 | Thompson | 180/349 |
| 1,312,993 | 8/1919 | Kessler | 180/299 |
| 1,448,133 | 3/1923 | Larson . | |
| 1,962,937 | 6/1934 | Richmond . | |
| 2,005,838 | 6/1935 | Bartlett | 280/788 |
| 2,169,916 | 8/1939 | Keeler | 180/299 X |
| 3,115,945 | 12/1963 | Dry et al. | 180/299 X |
| 4,159,126 | 6/1979 | Raleigh | 180/299 X |
| 4,355,844 | 10/1982 | Muzzarelli | 296/205 |
| 4,660,345 | 4/1987 | Browning | 296/205 X |
| 4,821,827 | 4/1989 | Reese | 180/299 X |
| 5,259,661 | 11/1993 | Thum | 296/204 |

*Primary Examiner*—Richard M. Camby
*Attorney, Agent, or Firm*—Donald W. Marks

[57] ABSTRACT

A chassis for an automobile has inner and outer frames pivotally connected together intermediate front and rear ends of the frames. The inner frame is connected directly to a rear end without resilient suspension and supports a motor driving a differential and rear wheels in the rear end. The outer frame supports a car body and a driver seat. Front steering wheels are supported by respective resilient suspensions on the outer frame. Rear resilient suspensions include rocker arms and Watts links connecting the inner and outer frames spaced from the intermediate pivot for resiliently controlling pivotal motion of the outer frame relative to the inner frame. The rear suspensions are positioned in front of the pivot between inner and outer chassis frames and in front of the motor.

6 Claims, 4 Drawing Sheets

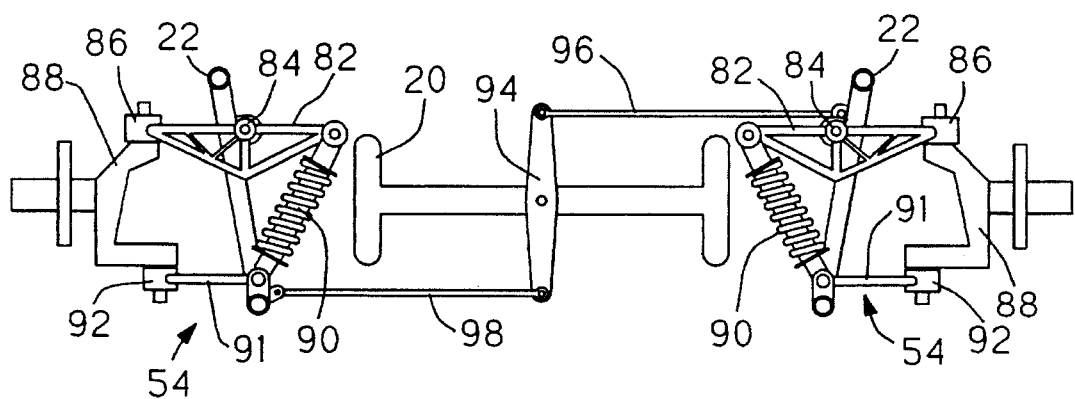
FIG. 5
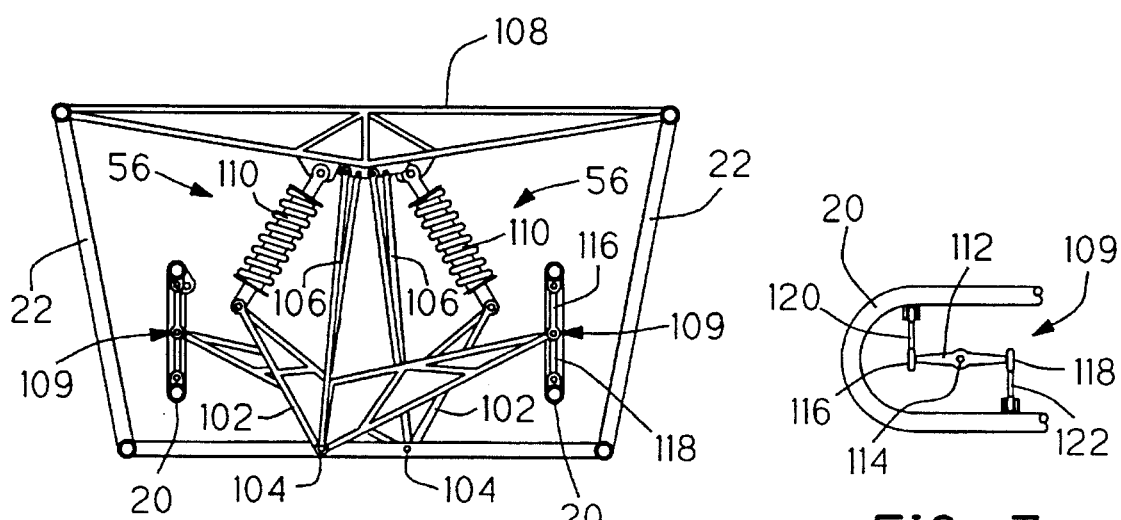
FIG. 6
FIG. 7

5,577,571

AUTOMOBILE CHASSIS WITH PIVOTED INNER AND OUTER FRAMES

TECHNICAL FIELD

The present invention relates to automobile chassis having dual frames, one frame for supporting a motor, a transmission and a rear end, and the other frame for resiliently suspending a car body, and particularly to chassis for racing cars wherein the motor supporting frame is directly connected to the rear axles without resilient suspension and the car body frame is resiliently mounted by four suspension points.

BACKGROUND ART

The prior art contains automobile chassis with dual frames wherein one frame supports the motor, transmission and rear end, and the other frame supports the car body and front wheels and is resiliently suspended on the wheel axles and/or motor frame. This separates the car body from the torque produced in the motor frame.

Generally, race cars having bodies with four point resilient suspension systems have not adopted the prior art dual frame chassis but rather employ chassis with single frames resiliently supported on the respective axles. At the start of a race or run, the sudden application of power by the motor to the rear wheels creates torque in a first rotative direction about the axis of the rear wheels and in a second rotative direction about the axis of the motor. In vehicles with a chassis having a single frame resiliently suspended at four points on the four wheel axles, application of reaction torque force to the rear wheels is delayed by compression and/or expansion of the suspension systems. Additionally the torque about the axis of the engine causes corresponding rotation of the chassis which can cause the car to steer toward one side.

In one class of race cars commonly known as dragsters, a single frame supporting the driver along with the motor and transmission is directly connected with the rear end. This results in the torque forces generated during racing to be applied immediately and directly to the rear wheels and tires to improve starting traction.

There is generally room for improvement in dual frame cars to improve starting traction.

SUMMARY OF INVENTION

The present invention is summarized in a chassis for an automobile having inner and outer frames pivotally connected together intermediate front and rear ends of the frames. The inner frame is connected directly to a rear end without resilient suspension and supports a motor driving the differential and rear wheels of the rear end. The outer frame supports a car body along with a driver seat. Front steering wheels are connected by respective resilient front suspensions to the outer chassis. Rear resilient suspensions connect the inner and outer frames spaced from the intermediate pivot for resiliently controlling pivotal motion of the outer frame relative to the inner frame.

An object of the present invention is to provide improved rear wheel traction in an automobile having a car body with four point resilient suspension.

An advantage of the invention is that an intermediate pivotal connection between inner and outer chassis frames reduces delay in application of reaction torque forces to rear wheels to improve traction.

Additional features of the invention include the provision of rear resilient suspension in front of the pivot between inner and outer chassis frames; the employment of rocker arm rear suspension; and the employment of Watts links in the suspension.

Other objects, advantages and features of the invention will be apparent from the following description and the accompanying drawings.

BRIEF DESCRIPTION OF DRAWINGS

FIG. 5 is a front view of front resilient suspensions for front steering wheels of the automobile of FIG. 1.

FIG. 6 is a front view of rear resilient suspensions for the automobile of FIG. 1.

FIG. 7 is a side view of a broken-away portion of the inner frame and rear suspension of FIG. 6.

DESCRIPTION OF THE PREFERRED EMBODIMENT

Figure 1:
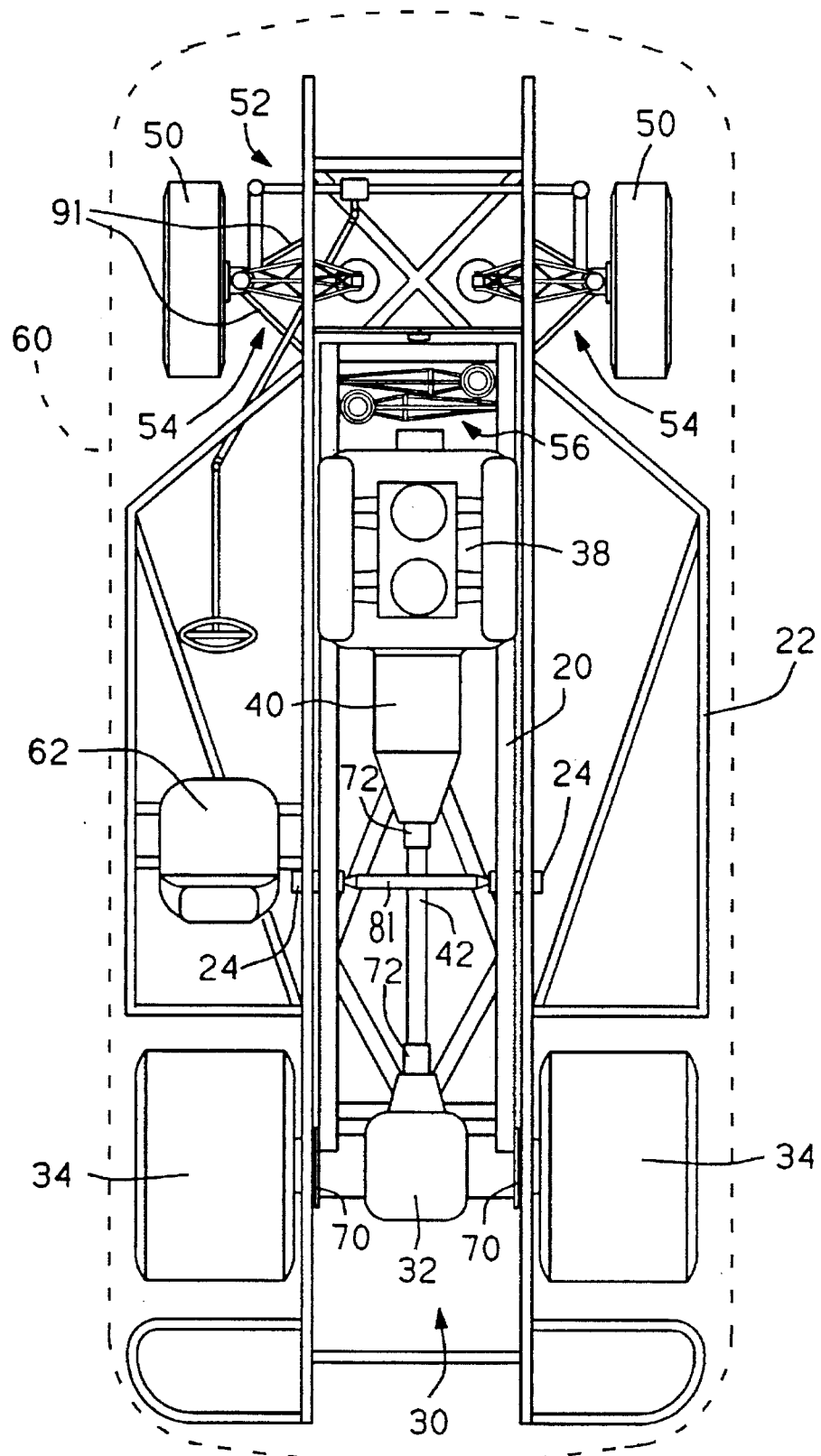
FIG. 1 is a diagrammatic horizontal section view of an automobile constructed in accordance with the present invention.

As shown in FIG. 1, an automobile having a chassis constructed in accordance with one embodiment of the invention includes an inner frame 20 and an outer frame 22 which are pivotally connected by pivots 24 intermediate front and rear ends of the frames. The inner frame is fixedly mounted on an automotive rear end 30 which includes a conventional automotive differential 32 and rear wheels 34. A motor 38 and a transmission 40 are mounted on the inner frame 20 and are connected by drive shaft 42 to the rear end 30 for driving the wheels 34. Front wheels 50 controlled by a conventional steering mechanism 52 are supported on the outer frame by resilient front suspensions 54. Resilient rear suspensions 56 connect the inner and outer frames 20 and 22 spaced from the pivots 24, such as to the front of the pivots, to limit and resiliently control pivotal movement between the inner and outer frames. A conventional car body 60 along with a driver seat 62 is suitably mounted on the outer frame 22. The illustrated automobile is particularly designed for racing.

In operation, the motor 38 applies power through the transmission 40, drive shaft 42 and differential 32 to the wheels 34 to move the automobile. During forward acceleration, the power from the motor produces a first torque about the axis of the rear wheels 34 tending to lift the front end of the automobile. Since the inner frame is directly mounted on the rear end 30 without any resilient suspension and since the inner frame 20 is connected to the outer frame 22 at pivots 24, an inertia reaction force from the car body, chassis, motor, transmission, etc., is directly and immediately applied through the inner frame 20 to the rear end 30 to increase traction of the wheels 34 with the road surface. This results in improved traction over conventional chassis systems where reaction inertia forces are applied through resilient suspensions which delay reaction forces as the resilient suspensions compress or expand from rotative motion about the axis of the rear wheels. Having the pivots intermediate the front and rear ends of the inner and outer frames 20 and 22 at points in center sections between the front and rear ends limits flexing of the frames during acceleration further enhancing immediate application of reaction forces to the rear wheels. Additionally torque about the axis of the motor 38 and drive shaft 42 is opposed by the rear end 30 through the rigid connection to the inner frame 20 which reduces rotative movement of the inner and outer frames about the axis of the motor to reduce affects on steering of the automobile.

Figure 2:
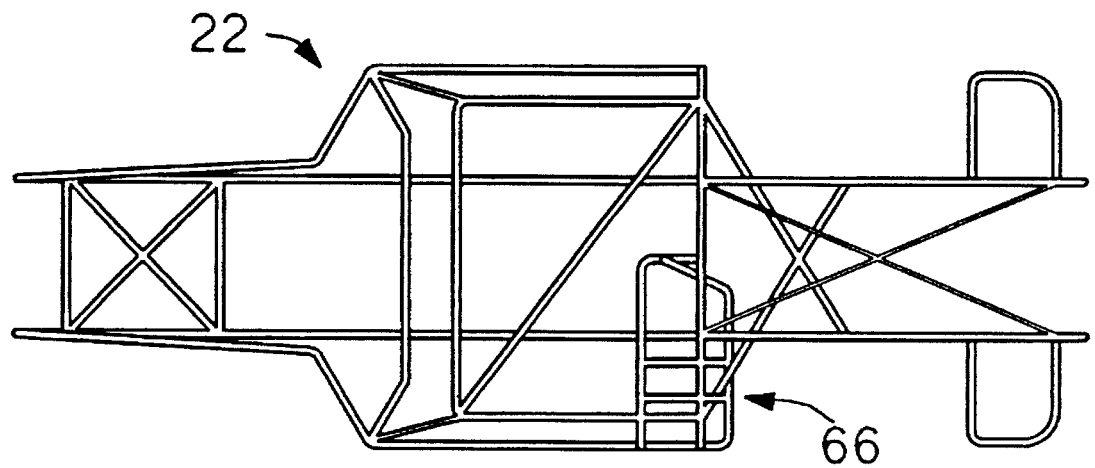
FIG. 2 is a top view of a outer frame in the chassis of the automobile of FIG. 1.
Figure 3:
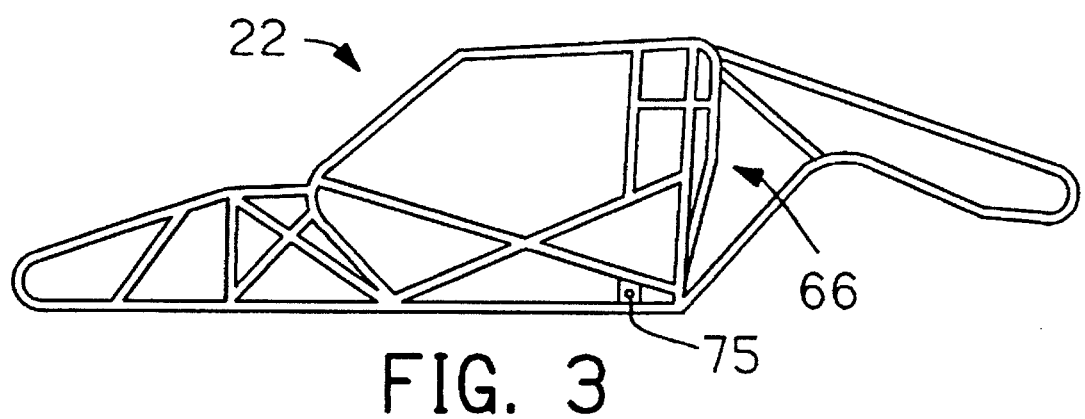
FIG. 3 is a side view of the outer frame of FIG. 2.

As shown in FIGS. 2 and 3, the outer frame 22 is a conventional tubular frame providing support for the car body 60 (FIG. 1), for example, 1992 SEC Mercedes-Benz aluminum body panels mounted conventionally on the tubular members of the frame 22. The outer frame 22 also includes an offset rollcage 66 and supports the driver seat 62 (FIG. 1), steering mechanism 52, fuel tank (not shown), battery (not shown), and fire system (not shown).

Figure 4:
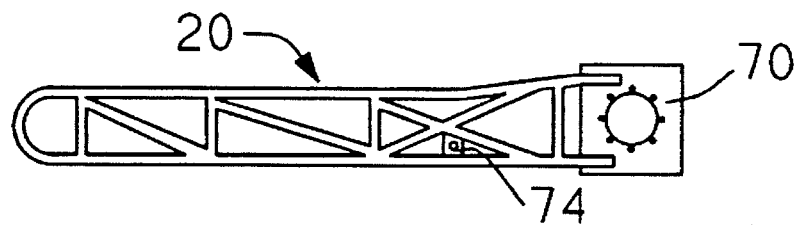
FIG. 4 is a side view of an inner frame of the automobile of FIG. 1.

The inner frame 20, see FIGS. 1 and 4, is also a tubular frame with attached rear brackets 70 for being mounted to the axle housings of the rear end 30. The motor 38 with the attached transmission 40 is mounted toward the front end of the inner frame 20 in a conventional manner. Since the motor 38 and the differential 32 are substantially fixed by the frame relative to each other, the drive shaft 42 is directly coupled, such as by spline joints or rigid collar couplings 72, between the transmission 40 and the differential 32 to eliminate the need for universal joints which tend to break.

Figure 8:
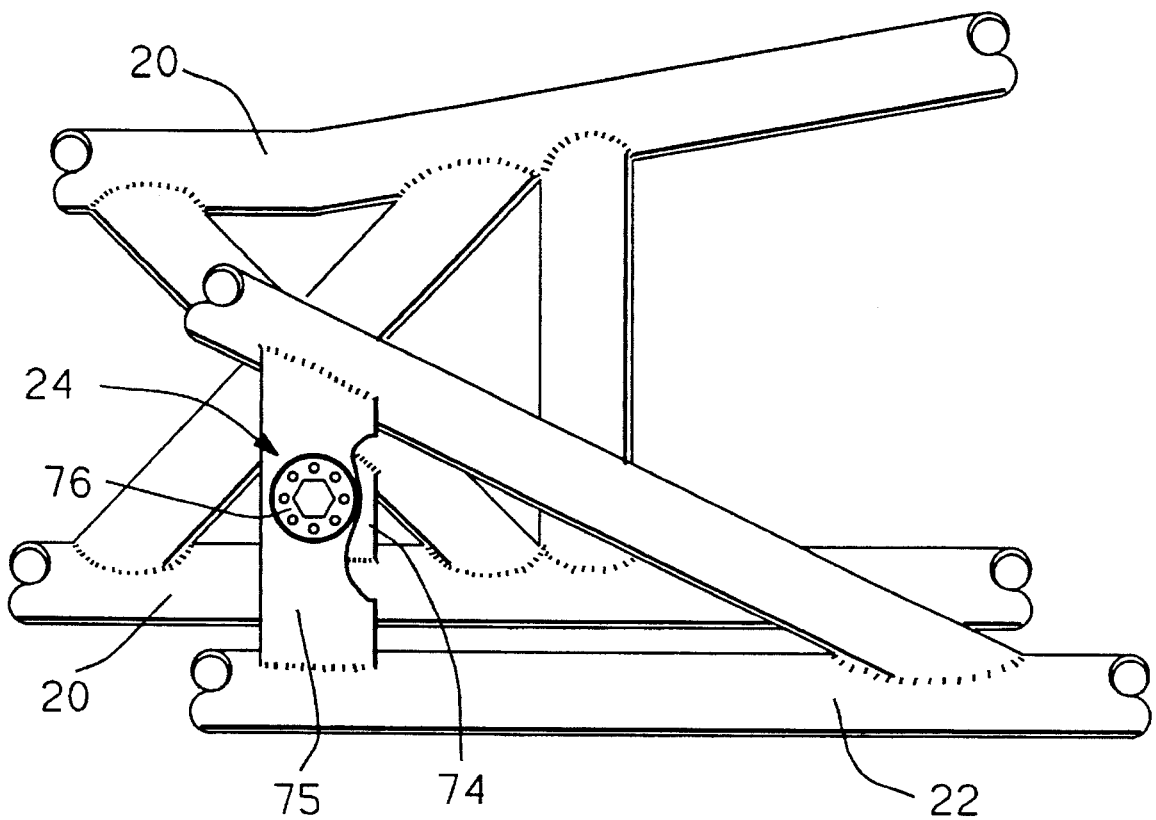
FIG. 8 is a side view of a broken-away portion of the outer and inner frames of FIG. 1.
Figure 9:
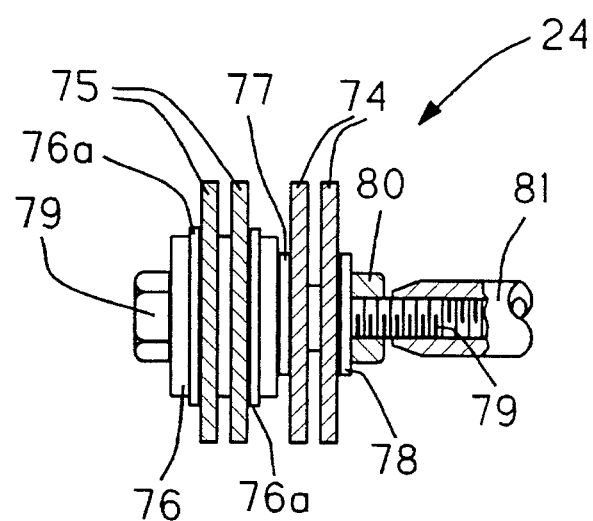
FIG. 9 is a sectional top view of a pivot joining the inner and outer frames of FIGS. 1 and 8.

Brackets 74, FIGS. 4, 8 and 9, are mounted on lower inner frame members intermediate the front and rear ends of the inner frame 20 and similar brackets 75, FIGS. 3, 8 and 9, are mounted on lower outer frame members intermediate the front and rear ends of the outer frame 22 for mounting the pivots 24. Each pivot 24 includes, for example, a roller bearing 76 mounted on the respective bracket 75 of the outer frame 22, thrust bearings 77 and 78 engaging the respective bracket 74 of the inner frame 20, and a bolt 79 and nut 80 securing the bearings 76, 77 and 78 together and serving as a pivot pin. A tube 81 with internally threaded ends fastened to the ends of the bolts 79 reinforces the inner and outer frames at the pivots.

As shown in FIG. 5, the front suspensions 54 include rocker arms 82 pivotally mounted by bearings 84 intermediate outer and inner ends of the rocker arms on the outer frame 22. Ball joints 86 connect the outer ends of the rocker arms to front axle units 88 while coil spring and shock absorber units 90 have upper ends pivotally connected to the inner ends of the rocker arms 82 and have lower ends pivotally connected to the outer frame 22 to provide resilient suspension for the front wheels. Conventional A-arms 91 pivot on the outer frame 22 and connect to ball joints 92 on the lower ends of the axle units 88.

A Watts link in front of the engine limits lateral movement between front portions of the inner and outer frames 20 and 22. The Watts link, FIG. 5, includes a vertical link 94 pivotally mounted at the center of the link 94 to the center of a front member of the inner frame 20, and left and right extending links 96 and 98 connecting respective upper and lower ends of the link 94 to respective left and right sides of the outer frame so as to restrict movement of the front end of the inner frame 20 to a vertical direction relative to the outer frame 22.

The rear suspensions 56, illustrated in FIG. 6, include left and right rear rocker arms 102 which have central rocker pivot bearings 104 mounted on lower members of the outer frame 22. Link pairs 106 extend downward from a tubular structure 108 bridging the left and right sides of the outer frame 22 and extending over the inner frame 20 to provide reinforcement for the lower members of the outer frame 22 supporting the central rocker pivot bearings 104. The rocker arms 102 have outer ends pivotally connected by respective Watts links 109 to the respective sides of the inner frame 20 and have inner ends pivotally connected to one ends of coil spring and shock absorber units 110 which are pivotally connected at opposite ends to the outer frame bridge 108 so as to provide a resilient suspension of the outer frame 22 relative to the inner frame 20. As shown in FIG. 7, each Watts link 109 includes a horizontal link 112 with a center bearing 114 pivotally mounting the link 112 on the outer end of the corresponding rocker arm 102. Outer ends of the link 112 are connected by ball or swivel joints 116 and 118 to one ends of respective vertical links 120 and 122 which have opposite ends pivotally connected to respective upper and lower members of the inner frame 20. The Watts links 109 prevent vertical movement of the outer ends of the rocker arms 102 and permit lateral movement of the outer ends of the rocker arms 102 relative to the inner frame 20 to accommodate pivotal movement of the rocker arms 102 relative to the outer frame 22 and to accommodate pivotal movement of the inner frame 20 relative to the outer frame 22.

The rear suspensions 56 are spaced from the pivots 24, FIG. 1, so as to limit and control the rotative movement of the outer frame 22 about pivots 24 relative to the inner frame 20. In the preferred embodiment of FIG. 1, the rear suspensions 56 are positioned forward from the pivots 24 and also in front of the motor 38. However, the rear suspensions could be positioned to the rear of the pivots 24. The front and rear suspensions 54 and 56 including the rocker arms 82 and 102 and the coil spring and shock absorber units 90 and 110 can be replaced by any other four point conventional resilient suspension system. In one preferred embodiment, the units 90 and 110 include adjustable gas shock absorbers and it is convenient to have the units closely spaced to provide controls for the dry nitrogen supply (not shown) to the shock absorber units.

Since many modifications, variations and changes in detail may be made to the above described embodiment without departing from the invention, it is intended that the above description and the accompanying drawings be interpreted as only illustrative of many possible embodiments within the scope and spirit of the invention as defined in the following claims.

What is claimed is:

1. A chassis for an automobile having a motor, a rear end including a differential driven by the motor, a pair of rear wheels driven by the differential, front steering wheels and a car body for supporting a driver, the chassis comprising:

an inner frame connected directly to the rear end without resilient suspension, the motor being mounted on said inner frame, an outer frame supporting the car body, pivot means pivotally mounting said outer frame to the inner frame intermediate front and rear ends of the inner and outer frames, front wheel suspension means for resiliently supporting the front steering wheels on the outer chassis, and rear suspension means connecting said inner and outer frames spaced from the pivot means for resiliently controlling pivotal motion of said outer frame relative to said inner frame.

2. A chassis as claimed in claim 1 wherein both the front and rear suspension means are in front of the pivot means.

3. A chassis as claimed in claim 1 wherein the rear suspension means includes left and right rocker arms pivotally connected at spaced points to the inner and outer frames and left and right springs and shock absorbers controlling pivotal movement of the rocker arms.

4. A chassis as claimed in claim 3 wherein the rear suspension means includes a bridge on the outer frame extending over the inner frame, links extending downward from the bridge and providing support for central pivot points of the respective left and right rocker arms.

5. A chassis as claimed in claim 4 including a vertical link having a center pivotally mounted on a central portion of a front end of the inner frame, and left and right extending links connecting upper and lower ends of the vertical link to respective opposite sides of the outer frame so as to restrict movement of the front end of the inner frame to a vertical direction relative to the outer frame.

6. A chassis as claimed in claim 2 wherein outer ends of the left and right rocker arms are connected by respective Watts links to respective left and right sides of the inner frame to permit lateral movement of the outer ends relative to the inner frame while preventing vertical movement of the outer ends relative to the inner frame.

\* \* \* \* \*